United States Patent
German et al.

(10) Patent No.: US 7,450,797 B2
(45) Date of Patent: Nov. 11, 2008

(54) BEAM SWITCH STRUCTURES AND METHODS

(75) Inventors: Kristine A. German, Webster, NY (US);
Peter M. Gulvin, Webster, NY (US);
Joel A. Kubby, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 11/734,419

(22) Filed: Apr. 12, 2007

(65) Prior Publication Data

US 2008/0002930 A1    Jan. 3, 2008

Related U.S. Application Data

(62) Division of application No. 10/918,093, filed on Aug. 13, 2004, now Pat. No. 7,221,817.

(51) Int. Cl.
*G02B 6/42* (2006.01)
*H01L 29/82* (2006.01)
*H01H 37/52* (2006.01)

(52) U.S. Cl. .................. 385/16; 385/40; 257/415; 337/53

(58) Field of Classification Search ............ 385/40; 257/415; 337/53
See application file for complete search history.

(56) References Cited

U.S. PATENT DOCUMENTS 3,833,878 A    9/1974  Bassett
4,339,740 A *  7/1982  Greenhalgh ............. 337/39
5,502,781 A    3/1996  Li et al.
5,905,241 A    5/1999  Park et al.
5,909,078 A    6/1999  Wood et al.
6,072,924 A    6/2000  Sato et al.
6,303,885 B1  10/2001  Hichwa et al.
6,310,419 B1  10/2001  Wood
6,388,359 B1   5/2002  Duelli et al.
6,407,478 B1   6/2002  Wood et al.
6,526,198 B1   2/2003  Wu et al.
6,911,891 B2   6/2005  Qiu et al.
7,092,272 B1   8/2006  Gilkey et al.
2004/0032000 A1  2/2004  Ma
2005/0206243 A1  9/2005  Bouche

OTHER PUBLICATIONS

Taher et al., "On A Tunable Bistable MEMS- Theory and Experiment", Journal of Microelectromechanical Systems, vol. 9, No. 2, p. 157-170, Jun. 2000.

* cited by examiner

*Primary Examiner*—James P Hughes
(74) *Attorney, Agent, or Firm*—Gibb & Rahman, LLC (57) ABSTRACT

A substantially straight beam in an unbuckled state is compressed to cause the beam to buckle using an adjustable compressor. The adjustable compressor applies force to one or both ends of the beam and limits compression on the beam to allow the beam to move between a first buckled state and a second buckled state. The first buckled state and the second buckled state comprise substantially equal magnitude and opposite direction buckling movements from the unbuckled state.

20 Claims, 9 Drawing Sheets

BEAM SWITCH STRUCTURES AND METHODS

CROSS-REFERENCE TO RELATED APPLICATION

This application is a Divisional of U.S. patent application Ser. No. 10/918,093, filed Aug. 13, 2004, now U.S. Pat. No. 7,221,817 the complete contents of which is incorporated herein by reference.

BACKGROUND

SUMMARY

Embodiments herein generally relate to switches such as a microelectro-mechanical systems (MEMS), such as MEMS switches (i.e., contacts, relays, shunts, etc.). MEMS are microdevices that integrate mechanical and electrical elements on a common substrate using microfabrication technology. The electrical elements are typically formed using known integrated circuit fabrication techniques. The mechanical elements are typically fabricated using lithographic and other related processes to perform micromachining, wherein portions of a substrate (e.g., silicon wafer) are selectively etched away or new materials and structural layers are added. MEMS devices include actuators, sensors, switches, accelerometers, and modulators.

In many applications, MEMS switches have intrinsic advantages over their conventional solid-state counterparts (e.g., field-effect transistor (FET) switches), including superior power efficiency, low insertion loss, and excellent isolation. However, MEMS switches are generally much slower than solid-state switches. This limitation precludes applying MEMS switches in certain technologies where sub-microsecond switching is required, such as switching an antenna between transmit and receive in high-speed wireless communication devices.

One type of MEMS switch includes a connecting member called a "beam" that is electro-thermally deflected or buckled. The buckled beam engages one or more electrical contacts to establish an electrical connection between the contacts. One benefit of using an electro-thermally deflected beam is that the switch requires a relatively low actuation voltage during operation. However, when the MEMS switch is in the actuated position, power is consumed continuously in order to maintain the resistive heating within the beam.

U.S. Patent Application Publication 2003/0210115 to Kubby (hereinafter "Kubby"), which is fully incorporated herein by reference, discloses a buckling beam bi-stable microelectro-mechanical switch. As described therein, Kubby discloses a process for creating a beam that is fabricated in one of the displaced positions. Only certain combinations of beam geometry, such as cross-section shape and shape along the beam's axis, can be chosen if a second displaced state is to exist.

Various exemplary embodiments described herein allow the beam choice to be based on the ideal distance between states and how high a force is needed to switch between states, instead of whether a particular combination will give two stable states. According to these exemplary embodiments, a substantially straight beam is formed in an unbuckled state and then compressed to cause the beam to buckle using an adjustable compressor. These embodiments also include a process of adjusting the position of the beam to adjust the amount that the beam buckles. During the compressing process, an adjustable compressor applies force to one or both ends of the beam and limits compression on the beam to allow the beam to move between a first buckled state and a second buckled state when pushed. The first buckled state and the second buckled state comprise equally opposite buckling movements from the unbuckled state.

Actuators push the beam between the first buckled state and the second buckled state, and the actuators are only activated during beam movement from the first buckled state to the second buckled state. Thus, the beam remains in either the first buckled state or the second buckled state once moved by the actuators. Further, because the beam is formed initially as a substantially straight member, an equal force is required to move the beam into either the first buckled state or the second buckled state, and the beam is considered to be "bi-stable."

In various exemplary embodiments, a microelectromechanical system (MEMS) buckled beam switch comprises a beam, actuators on opposite sides of the beam, and an adjustable compressor positioned at one end or both ends of the beam compressing the beam into the buckled state. The embodiments herein also include a fixed anchor at a first end of the beam and flexible members (e.g., springs, etc.) at the other (second) end of the beam. These and other features are described in, or are apparent from, the following detailed description.

EMBODIMENT

There are many applications for switches in MEMS. In microfluidics, a switch might be used to open and close a valve, or to direct flow down one of two pipes. In optics, a switch could be used to steer light down a different waveguide (standard optical switch) or to add and drop channels in a WDM system (optical add-drop multiplexer). The ideal switch consumes little power, retains its state when the power is turned off, has reproducible states, and does not wear or fatigue. A switch employing a bistable beam can be designed to meet all of these attributes.

Instead of creating the beam in the displaced position ("pre-shaped"), the various exemplary embodiments herein fabricate a straight beam and buckle it after fabrication ("post-buckled"). The buckling can be done manually with an individual probe or probe card, or electrically using an integrated actuator. One or both of the beam ends are attached to a support structure of beams and anchors that allow on-axis translation for compressing the beam while avoiding rotation. The result is that any length and width combination will yield a beam with two symmetrical stable states. This allows the beam choice to be based on the ideal distance between states and how high a force is needed to switch between states, instead of whether a particular combination will give two stable states.

Figure 1:
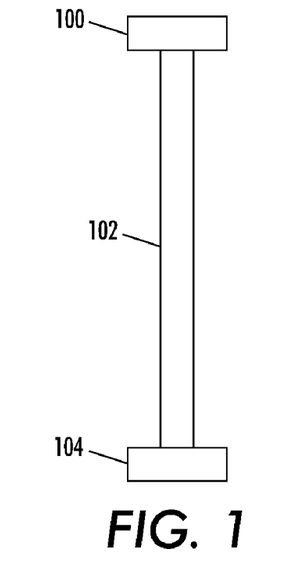
FIG. 1 is a schematic diagram of a substantially straight beam.
Figure 2:
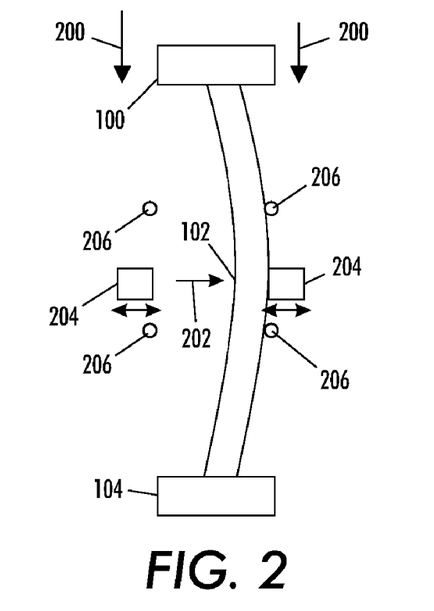
FIG. 2 is a schematic diagram of a buckled beam.

More specifically, as shown in FIG. 1, an exemplary embodiment comprises a straight or substantially straight beam 102 held in place by top and bottom anchors 100, 104. In FIG. 1, the beam 102 is in an unbuckled state and is then compressed (arrows 200 in FIG. 2) to cause the beam 102 to buckle toward one side or the other using an adjustable compressor 300, 400 (shown in FIGS. 3 and 4) which can comprise a wedge-shaped or cam-shaped structure.

The various exemplary embodiments also provide a process of adjusting the compression of the beam 102 to adjust the amount that the beam 102 buckles. During the compressing process, the adjustable compressor (300, 400) contacts the beam 102 and applies force to one end of the beam 102. After compression, the beam 102 can move between a first buckled state (toward one side) and a second buckled state (toward the other opposite side). The first buckled state and the second buckled state comprise equally opposite buckling movements from the unbuckled state shown in FIG. 1.

To switch the beam 102 between states, one or more actuators 204 can be used to push the beam 102 until it has moved far enough for the beam 102 to carry itself the rest of the way to the second stable state. The actuators 204 push the beam 102 between the first buckled state and the second buckled state. Because the beam 102 is symmetrical, the actuators 204 are only activated during beam 102 movement and the beam 102 remains in either the first buckled state or the second buckled state once moved by the actuators. Further, because the beam 102 is formed initially as a substantially straight member 102 (as shown in FIG. 1), an equal force is required to move the beam 102 into the first buckled state and the second buckled state, and the beam 102 is considered to be "bi-stable."

Once the beam 102 has been buckled, it is moved between states using an actuator or similar device. For example, various exemplary embodiments can use a thermal actuator 204 that moves an impact arm, which collides with the beam 102, and pushes it to the other state. The thermal actuator is typically a "v-shaped" actuator. The thermal actuator is useful because of the large force it generates, despite its relatively small size. A thermal actuator 204 has an almost-straight beam with a slight offset (tilted about 1°) that encourages the beam to buckle in the desired direction when heated by a current passing through it. Actuation could also be accomplished using other types of actuators 204, such as comb drives, parallel-plate drives, scratch drives, impact drives, U-shaped thermal actuators, or magnetic drives.

Figure 5:
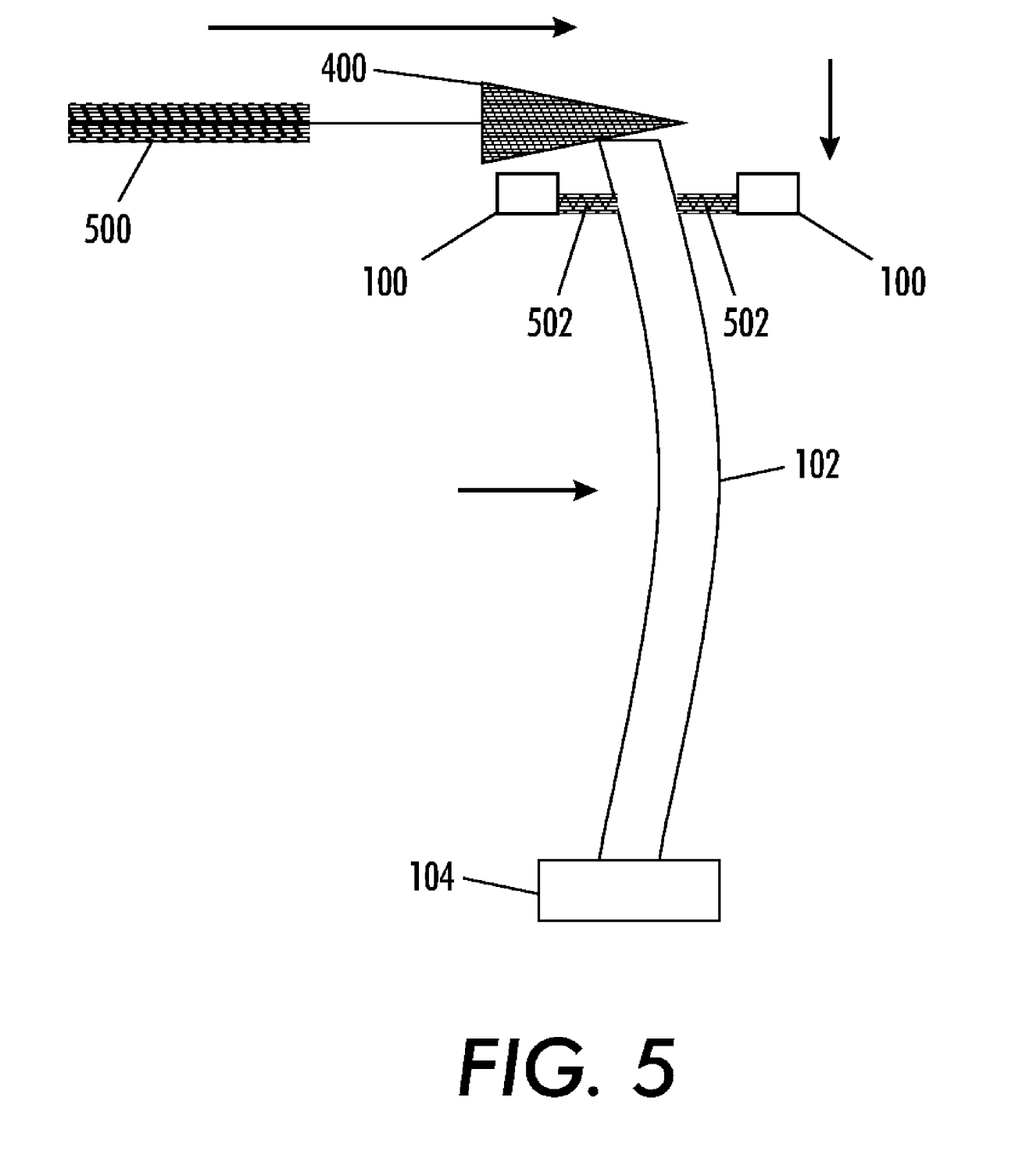
FIG. 5 is a schematic diagram of a buckled beam.

As shown in FIG. 5, the MEMS buckled beam switch can include an adjustable compressor 400 positioned at one end of the beam compressing the beam into the buckled state. The embodiment in FIG. 5 also includes flexible members 502 (e.g., springs, flexible silicon beams, etc.) connecting the beam 102 to the top anchors 100. The adjustable compressors 400 can be connected to any type of linear adjustment mechanism 500, such as screw threads, actuators, etc. that produce horizontal movement. The wedge or cam 400 converts such horizontal movement into downward movement. Stated more broadly, the wedge or cam 400 translates movement in a first direction into movement in a direction approximately perpendicular to the first direction. This allows more precise control of compression than can be achieved using a purely linear actuator 300 that moves in a direction parallel to the length of the beam 102.

The large scale actuation can be provided by any of a wide variety of linear adjustment mechanisms 500, such as actuators. Some possibilities include capacitive drives such as "comb drives," thermal actuators, impact drive actuators, scratch drive actuators, or magnetic actuators. The optimal choice of actuators depends on the force that the actuator will be pushing against, the range of motion required, whether the on-board electronics can handle high voltage or high current, and other factors.

As shown in FIG. 5, as the wedge 400 is pushed to the right, it pushes on the top of the buckled beam 102. As mentioned above, the beam 102 is connected to the anchors 100 via flexible members 502, set far enough apart that translational motion is much more likely than rotational. The slope of the wedge 400 is gradual enough that the force required to wedge it into place remains sufficient even when the springs 502 holding the buckled beam 102 are short and stiff. Instead of using an actuator to move the wedge or cam 400, the motion could be done manually (e.g., through probe card pushing or screw 500 adjustment). Assembling the devices manually may not always be an efficient approach, but if a custom probe card is used that has fingers in appropriate locations, assembly could be turned into cost-effective batch fabrication.

Figure 4:
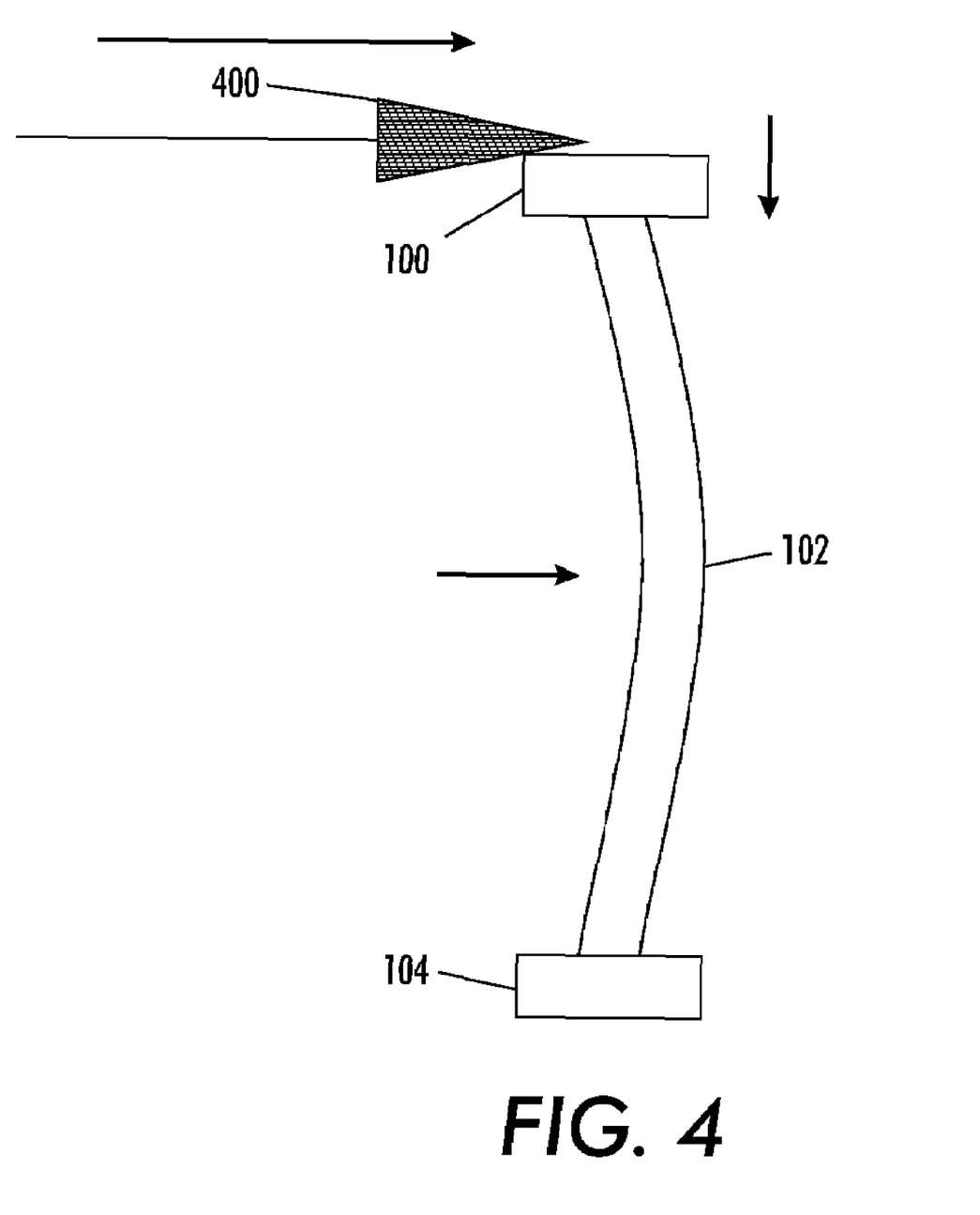
FIG. 4 is a schematic diagram of a buckled beam.

The anchor 100 in FIG. 4 can be moved to compress the beam and then can be fixed in the compressed position after movement (using any well-known technique, such as bonding, attaching, fastening, etc.) or the flexible members 502 can be used to allow the compression of the beam to be adjusted and/or re-adjusted at any time. This allows the amount that the beam buckles to be adjusted during the manufacturing process, after manufacturing when installing a MEMS switch, or when servicing a MEMS switch already in use.

Figure 3:
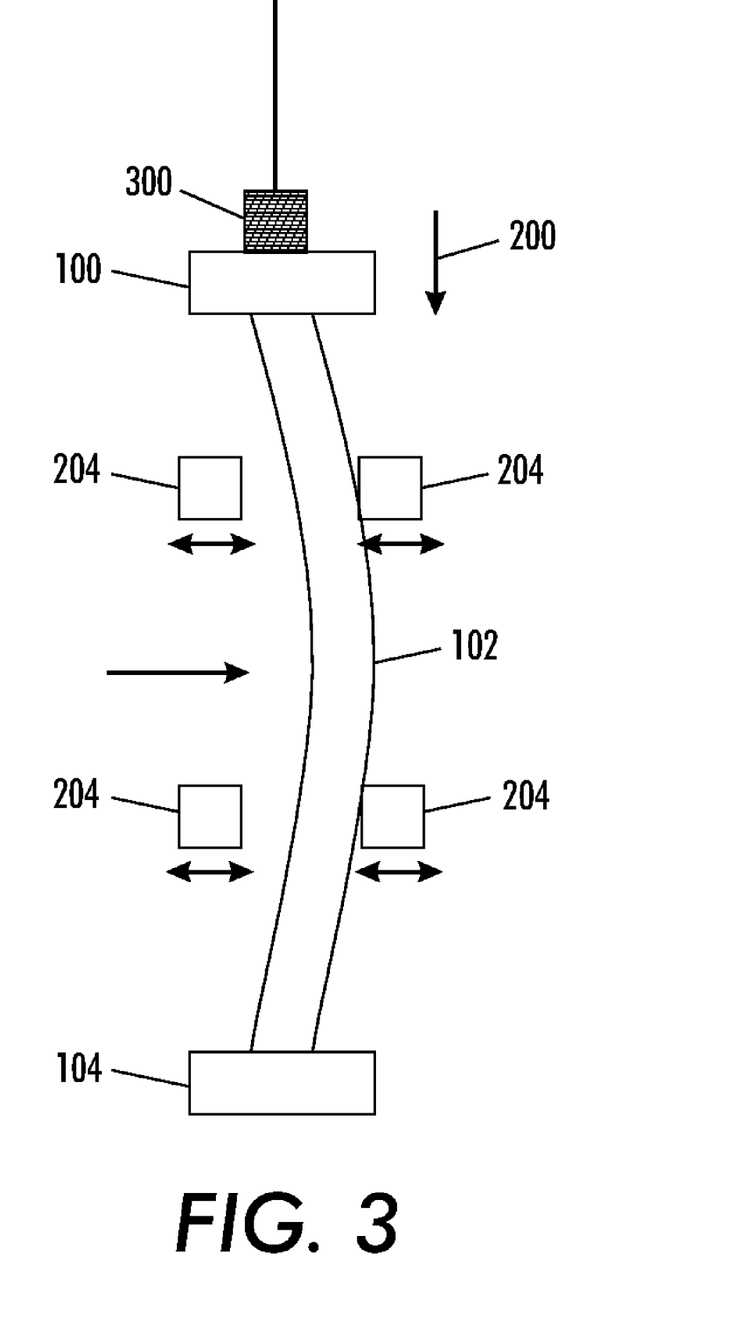
FIG. 3 is a schematic diagram of a buckled beam.

Depending on the distance between the states and the force required, the point of application of the force may change. If the force required is large and the distance between states is small, a shorter, stiffer actuator can be used, pushing on the center of the switch beam 102. If the distance between the states is too great and the actuator required would be too large, then a pair of actuators 204 can be used instead, as shown in FIG. 3, pushing on the beam 102 equal distances from the center of the beam 102. The displacement required will be less, but the force required will be larger. For example, if the points of application of the force are halfway between the center and the anchors, the distance that the actuators 204 need to push is about half of the motion required in the center, and the force required is about twice as large.

Thus, to amplify the motion of a small-displacement, high-force actuator 204, the force from the actuators 204 can be applied away from the beam 102 center where the displacement is smaller and/or multiple actuators can be used per side, as shown in FIG. 3. Mechanical stops 206 can be added to make the position of the switch states accurate to the tolerance of the lithography and etching, thereby compensating for inadvertent changes in beam deflection due to variations in beam width. Actuators 204 and stops 206 are not shown in all the figures to avoid clutter and allow the salient features of the embodiments to be more clearly seen.

The various exemplary embodiments provide a switch that is able to move between two states and maintain the states without the application of power. To the contrary, switches based on asymmetric pre-shaped buckled beams are fabricated in one of the two stable states, with a buckled second state nearly opposite the first. Such beams have zero stress in one state, while the buckled state will have a good deal of stress. Such beams are not symmetric. Thus, only certain geometries of asymmetric beams will work. If the asymmetric buckling beam has too much bending stress when displaced to the intended second state, such as would be the case if the beam is too short and/or wide, the second state may not exist, or the forces required to move to it may be too great, making reaching it impractical.

Thus, with asymmetric beams, the stress of the two states will be different, since the stress of the as-fabricated first state is zero and buckled state requires bending of the beam. This lack of symmetry means that the presence of one state does not guarantee another. Only certain geometries of asymmetric beams will give a second stable state, which means that there is an extra constraint on the problem that would not exist in a symmetrical situation of the embodiments herein. Instead of being able to pick beam geometries such that they give the ideal distance and potential barrier between states (as can be done with the embodiments herein) conventional techniques must also test each asymmetric beam geometry to verify that a second state can be attained.

Figure 6:
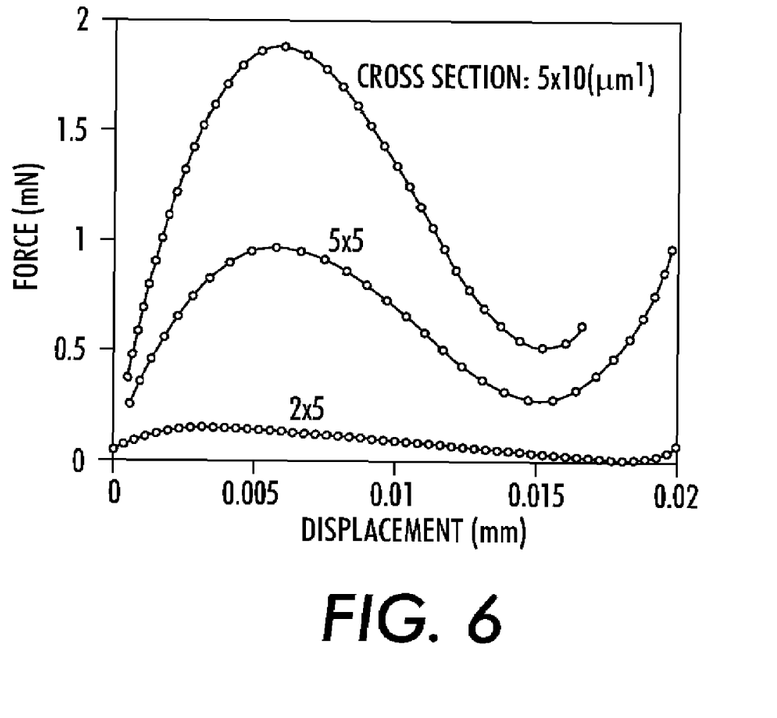
FIG. 6 is a graph showing asymmetric buckled beam geometry and corresponding force vs. displacement.

FIG. 6 shows force curves that demonstrate, for a given length, only certain beam cross-sections yield a second stable state. The force shown is the sum of all the forces on the beam when displaced by the amount indicated. The curve labeled "2×5" represents a beam 2 microns wide and 5 microns tall. As the beam is displaced by 5 microns (0.005 mm) the force is still positive, indicating that the force is such that it would push the beam back to where it started at zero displacement. At around 15 microns of displacement the force goes to zero, indicating an equilibrium point, but any tiny displacement away from that point in either direction would lead to a force propelling it further from that point, so this is an unstable equilibrium (like a ball on top of a hill). At about 19 microns of displacement the force again goes to zero, but here any slight displacement causes a force that brings the beam back to the equilibrium (like a ball in the bottom of a valley). Note that the force curves for the other two cross-sections never come back down through zero, and thus do not have second equilibrium states.

The various exemplary embodiments herein produce less stress on the beam than asymmetrical buckling beams. In asymmetrical buckling beams, the stress goes from 0 in the first state to StressMax in the second state, instead of from −½ StressMax to +½ StressMax, as in the various symmetrical designs of the embodiments herein. Further, with the embodiments described herein, power is only required when the actuator 204 is switching the beam 102. For example, v-beam thermal actuators only require that the heating current flow for approximately 1-2 ms. Given a voltage of 15 V P-P, and a current of 30 mA (P=I×V=0.45 W) with a duration of 2 ms, the total energy used to switch the beam is less than a millijoule.

One factor that could affect the symmetric nature of the beam 102 is stress in the beam. Therefore, the substantially straight beams 102 are constructed from a non-stressed material, such as single-crystalline silicon which, unlike polysilicon, has no inherent stress. Stress can also be caused by changes in temperature for materials with different coefficients of thermal expansion. To avoid the problems of thermal stress, devices can be packaged with thermo-electric coolers to maintain proper temperature.

The position of each stable state (first or second) depends on how reproducibly the silicon bends. Single-crystalline silicon has been shown to be perfectly elastic. It is brittle like glass and will shatter before it yields, so it is accurate right up to the point of failure. Thus, the position of the second state is highly reproducible. However, the actual position of the beam 102 may not be accurate to the degree required for some precise alignment devices, such as waveguides. For example, the position of the beam 102 depends on the width of the beam 102, which could vary up to about 5%. Thus, mechanical stops 206 are added to force the beam 102 to stop in the correct position. Since the stop is on the same photomask layer as the beam 102 itself, the position of the stop is accurate to less than a tenth of a micron.

Since the motion of the embodiment MEMS switch is entirely in the bending of the beam 102, the switch has no parts that rub together, so there is no mechanism for wear. The actuator collides with the switch, so wear is possible in that area, but this does not affect the position of either state. Any actuator displacement that decreases with time can be compensated for by making the displacement larger initially. Since the beam 102 "snaps" and pulls away from the actuator as it draws near the second state, an extra large displacement of the actuator will not present any disadvantages.

Thus, as shown above, instead of creating an asymmetric beam in the displaced position ("pre-shaped"), the various exemplary embodiments herein compresses a straight beam to buckle it after fabrication ("post-buckled") using a mechanism that does not require power after buckling. The buckling can be done manually with an individual probe or probe card, or electrically using an integrated actuator. One or both of the beam ends are attached to a support structure of beams and anchors that allow on-axis translation while avoiding rotation. The result is that any length and width combination will yield a beam with two stable states, by symmetry.

Figure 7:
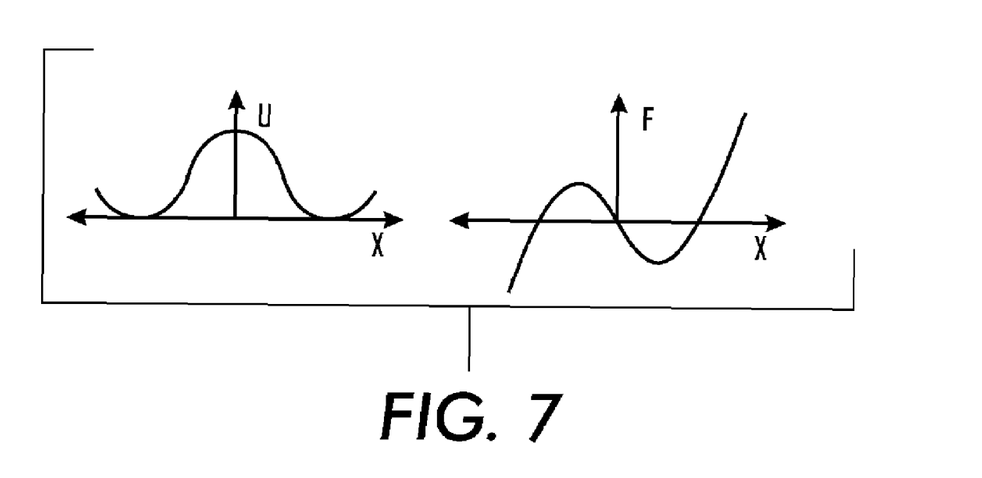
FIG. 7 is a diagram of potential energy and force vs. displacement curves for symmetric bi-stable beam.

Shown in FIG. 7 are the potential energy (U) and force (F) curves for the symmetric bi-stable buckled beam 102. The height of the potential hill between the states should be large enough to prevent inadvertent changes in state, such as might be caused by a chip being jostled. The distance between the states is determined by the geometry of the beam 102 and how much the beam 102 is compressed during post-fabrication buckling.

Figure 8:
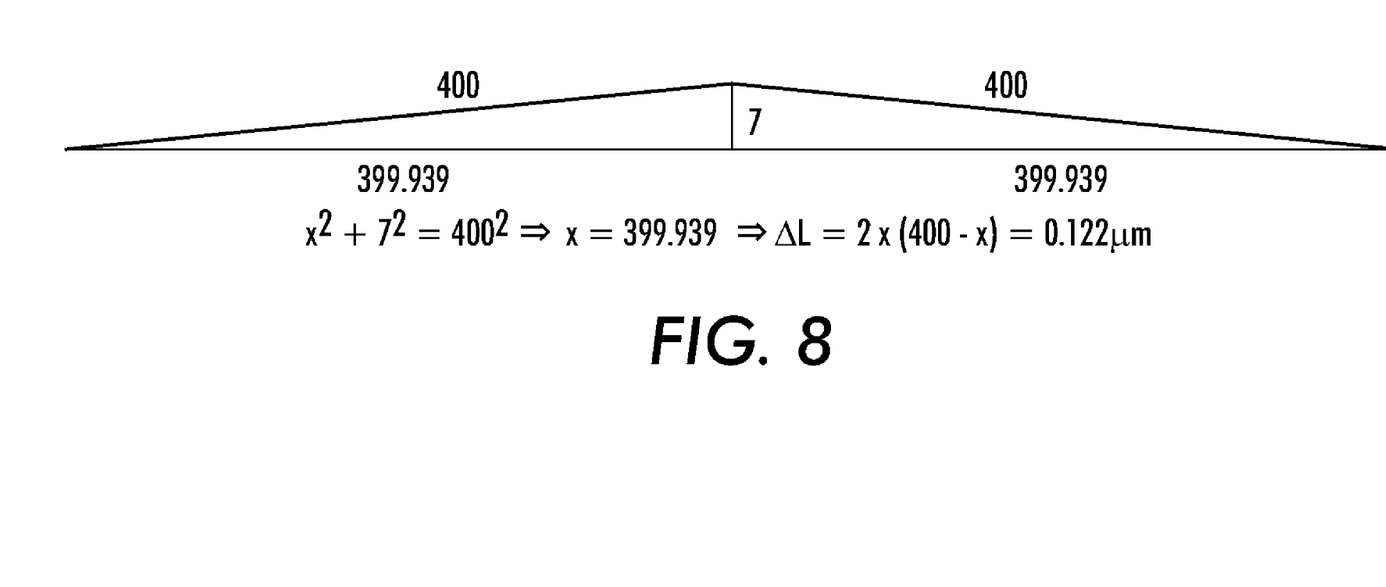
FIG. 8 is a diagram illustration calculations required for compression of buckled beam trigonometrically.

In one example, a beam will be compressed to allow for a distance between states of 10-15 microns. Assuming the beam is 800 microns long, and the desired distance between states is 14 microns, FIG. 8 shows how the compression is approximated. The length of sides of a right triangle can be calculated using $a^2+b^2c^2$, where c is the hypotenuse and a and b are the sides of the right triangle. When the beam buckles, it can be considered to form two right triangles, each having a hypotenuse of 400 microns. The actual shape will be rounded instead of kinked, but this gives a good first approximation. In this example, the entire beam movement is desired to be 14 microns, and half that movement would be from the straight center position toward one side. Thus, one side of each of the two right triangles is 7 microns. As shown in the calculations in FIG. 8, the other side of each right triangle is 399.939 microns. Thus, the distance between the ends of the beam must be reduced by 0.122 microns ((400−399.939)×2)=0.122) in order to have the beam buckle 7 microns toward one side. The result is that only a very small compression of the beam (about a tenth (e.g., 0.122 microns) of a micron) is necessary to achieve a buckling of 7 microns from the center, unbuckled position.

This small displacement is very difficult to achieve and maintain with a typical system given the standard design rule that 2-3 microns of space are required between parts of the mechanism. Therefore, some embodiments herein use a wedge or cam 400 to convert large-scale motion in one direction to fine motion in an approximately perpendicular direction, based on how quickly the width of the wedge and the radius of the cam change.

Figure 9:
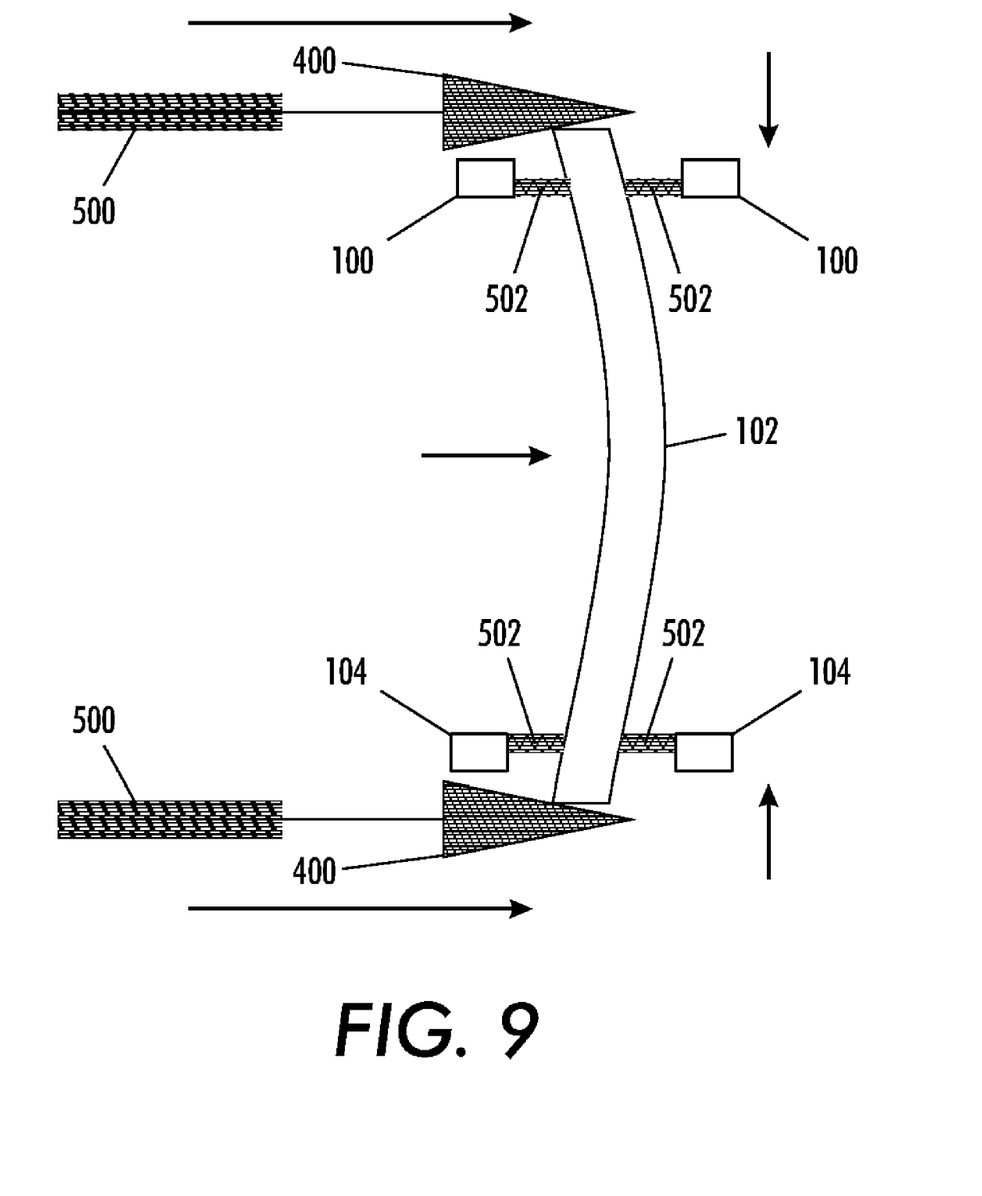
FIG. 9 is a schematic diagram of a buckled beam.

Additional embodiments prevent the center point of the buckled beam 102 from shifting when the beam 102 is compressed. First, both ends of the beam 102 can be shifted instead of just one end, using wedges 400 at each end, as shown in FIG. 9. This preserves symmetry, but increases the complexity and size of the system.

Another embodiment prevents the center point of the buckled beam from shifting by building a correction into the design, shifting the part so that, once displaced by buckling, it ends up in the desired location. For example, if a 500 micron long beam 102 anchored on one end (as shown in FIGS. 4 and 5) is to be compressed by 10 microns, this would shift the point of maximum beam deflection by 5 microns, since it is at the center of the beam that is now 490 microns long instead of 500. Thus, if the actuators are intended to push on the point of maximum deflection, they must be placed 245 microns (490/2) from the anchored end.

Figure 10:
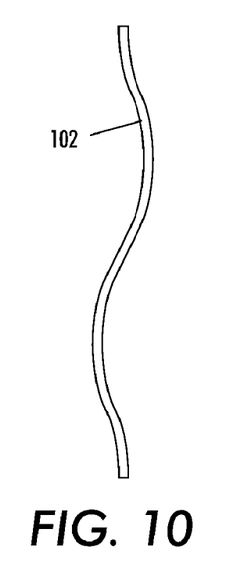
FIG. 10 is a schematic diagram of a buckled beam.

If only one beam is used, the beam 102, may snap into an S-shaped mode (as seen in FIG. 10) on its way to the desired second state, or even stay in that S-shaped mode if it is stable. The embodiment shown in FIG. 11 avoids this by using two beams 150, 152, joined in the center by a substantially rigid beam 154 that is positioned perpendicular to the beams 150, 152. The presence of the rigid beam 154 enforces the boundary condition that the center of the beam must have zero slope, preventing the "S-shaped" mode from forming.

Figure 11:
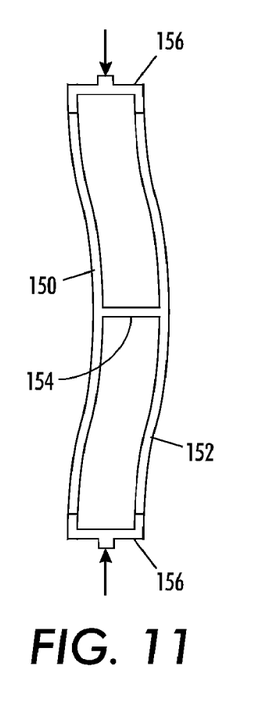
FIG. 11 is a schematic diagram of a buckled beam.
Figure 12:
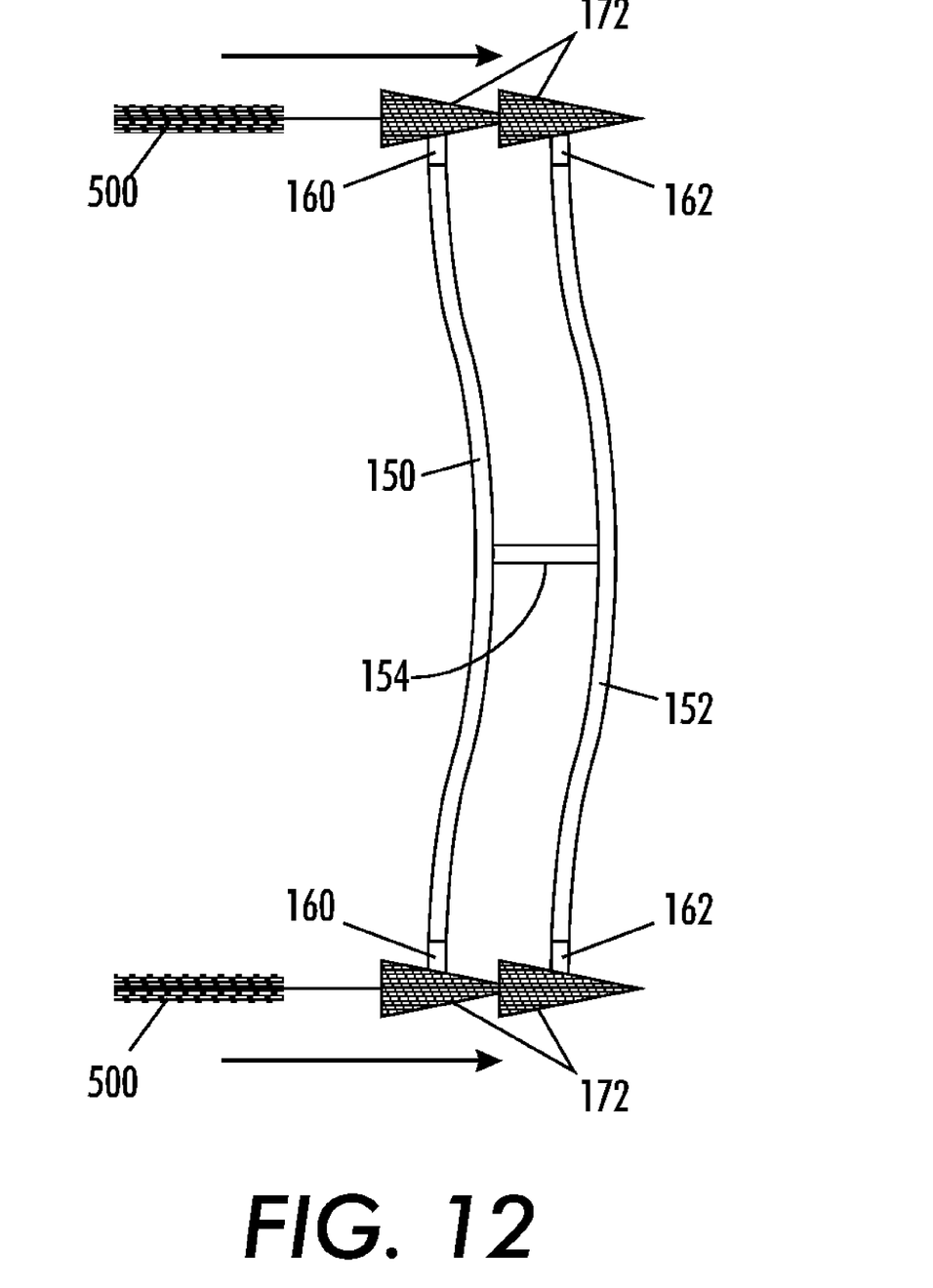
FIG. 12 is a schematic diagram of a buckled beam.

For the dual-beam geometry to buckle properly, the buckling of the beams should be the same. The previous embodiment accomplishes this by connecting both beams to the same moving part(s), so that they share one or both anchor(s) 156, as shown in FIG. 11. Thus, there is no way for the beams 150, 152 to buckle independently. Alternatively, the embodiment shown in FIG. 12 can use separate moving anchors 160, 162, but the actuator 500 for displacing the anchors 160, 162 is connected to both adjustable compressors 172. Thus, as shown in FIG. 12, the wedges 172 that buckled the beams are joined rigidly, so that they are both moved by the same actuator 500.

The number and location of actuators 204 (FIG. 3) can also determine whether the beam(s) switch states by passing through the first buckling mode, or through a higher buckling mode. In the case of a single beam 102 switch, if the forces are applied away from the center of the beam 102 and simultaneously, the S-shaped mode will not likely form. If one actuator fires before the other, the S-shaped mode can be encouraged to form, which tends to decrease the total force required to switch states.

For applications using bi-stable beams, system requirements should be considered to determine if the single beam or dual beam configuration is the most advantageous. Even within an application, such as planar waveguide optical switching, the optimal configuration depends on the design and generally involves trade-offs. For example, a planar waveguide switch having a movable waveguide platform and actuator attached to one side of a single bi-stable beam (FIG. 5) is a design that allows easy routing of stationary waveguides to the moving platform, and has a relatively simple beam compression mechanism.

While the foregoing has been described in conjunction with various exemplary embodiments, it is to be understood that many alternatives, modifications and variations would be apparent to those skilled in the art. Accordingly, Applicants intend to embrace all such alternatives, modifications and variations that follow in this spirit and scope.

What is claimed is:

1. A method of manufacturing a beam switch, said method comprising:
   forming a substantially straight beam comprising a non-stressed material in an unbuckled state, said non-stressed material having no inherent stress in said unbuckled state;
   compressing said beam to cause said beam to buckle;
   anchoring said beam in a buckled state; and
   positioning actuators on opposite sides of said beam.

2. The method according to claim 1, wherein said beam moves between a first buckled state and a second buckled state.

3. The method according to claim 2, wherein said first buckled state and said second buckled state comprise equally opposite buckling movements from said unbuckled state.

4. The method according to claim 2, further comprising pushing said beam using said actuators between said first buckled state and said second buckled state, wherein said actuators are only activated during beam movement.

5. The method according to claim 2, wherein said beam is in said first buckled state, said beam is in a first stable state, and wherein, when said beam is in said second buckled state, said beam is in a second stable state.

6. A method of manufacturing a beam switch, said method comprising:
   forming a substantially straight beam comprising a non-stressed material in an unbuckled state, said non-stressed material having no inherent stress in said unbuckled state;
   compressing said beam using a wedge-shaped structure comprising a sloped surface to cause said beam to buckle;
   anchoring said beam in a buckled state; and
   positioning actuators on opposite sides of said beam.

7. The method according to claim 6, wherein said beam moves between a first buckled state and a second buckled state.

8. The method according to claim 7, wherein said first buckled state and said second buckled state comprise equally opposite buckling movements from said unbuckled state.

9. The method according to claim 7, further comprising pushing said beam using said actuators between said first buckled state and said second buckled state, wherein said actuators are only activated during beam movement.

10. The method according to claim 7, wherein said beam is in said first buckled state, said beam is in a first stable state, and wherein, when said beam is in said second buckled state, said beam is in a second stable state.

11. A method of manufacturing a beam switch, said method comprising:
    forming a substantially straight beam comprising a non-stressed silicon material in an unbuckled state, said non-stressed silicon material having no inherent stress in said unbuckled state;
    compressing said beam using a wedge-shaped structure comprising a sloped surface contacting an end of said beam to cause said beam to buckle;
    anchoring said beam in a buckled state; and
    positioning actuators on opposite sides of said beam.

12. The method according to claim 11, wherein said beam moves between a first buckled state and a second buckled state.

13. The method according to claim 12, wherein said first buckled state and said second buckled state comprise equally opposite buckling movements from said unbuckled state.

14. The method according to claim 12, further comprising pushing said beam using said actuators between said first buckled state and said second buckled state, wherein said actuators are only activated during beam movement.

15. The method according to claim 12, wherein said beam is in said first buckled state, said beam is in a first stable state, and wherein, when said beam is in said second buckled state, said beam is in a second stable state.

16. A method of manufacturing a beam switch, said method comprising:
   forming a substantially straight beam comprising a non-stressed silicon material in an unbuckled state, said non-stressed silicon material having no inherent stress in said unbuckled state;
   compressing said beam using an adjustable compressor comprising a wedge-shaped structure comprising a sloped surface to cause said beam to buckle;
   anchoring said beam in a buckled state; and
   positioning actuators on opposite sides of said beam.

17. The method according to claim 16, wherein said beam moves between a first buckled state and a second buckled state.

18. The method according to claim 17, wherein said first buckled state and said second buckled state comprise equally opposite buckling movements from said unbuckled state.

19. The method according to claim 17, further comprising pushing said beam using said actuators between said first buckled state and said second buckled state, wherein said actuators are only activated during beam movement.

20. The method according to claim 17, wherein said beam is in said first buckled state, said beam is in a first stable state, and wherein, when said beam is in said second buckled state, said beam is in a second stable state.

\* \* \* \* \*